United States Patent [19]

Foote et al.

[11] Patent Number: 4,577,712
[45] Date of Patent: Mar. 25, 1986

[54] OFF-THE ROAD VEHICLE FOR RECREATIONAL AND WORK APPLICATIONS

[75] Inventors: Douglas C. Foote, Coon Rapids; James E. Grinde, Anoka, both of Minn.

[73] Assignee: Yamaha Hatsudoki Kabushiki Kaisha, Japan

[21] Appl. No.: 645,821

[22] Filed: Aug. 31, 1984

[51] Int. Cl.$^4$ ............................................. B60K 17/28
[52] U.S. Cl. ................................ 180/53.4; 180/53.1
[58] Field of Search ............... 180/53.4, 53.1; 74/11, 74/15.2, 15.86; 172/125; 56/10.6, DIG. 11

[56] References Cited

U.S. PATENT DOCUMENTS

| | | | |
|---|---|---|---|
| 3,583,535 | 6/1971 | Plamper | 180/53.1 |
| 3,608,285 | 9/1971 | Berk | 180/53.1 |
| 3,613,815 | 10/1971 | Meylink | 180/53.1 |
| 4,258,765 | 3/1981 | Suomi | 180/53.4 |
| 4,304,141 | 12/1981 | Tone et al. | 180/53.1 |

FOREIGN PATENT DOCUMENTS 2820053 11/1978 Fed. Rep. of Germany.

*Primary Examiner*—Richard A. Bertsch
*Attorney, Agent, or Firm*—Orrin M. Haugen; Thomas J. Nikolai

[57] ABSTRACT

An off-the-road recreational vehicle is described which has at least one steerable front wheel, two driving rear wheels, an engine unit mounted in the vicinity of the center of the vehicle frame for transmitting power from the engine's shaft to the rear driving wheels through a transmission mechanism and a rider's seat arranged above and rearward of the engine unit. To convert the recreational vehicle to a work vehicle, a hydraulic pressure generating mechanism, including a hydraulic pump and a hydraulic fluid reservoir provided with the pump being driven by the engine's shaft at a point upstream of the vehicle's transmission. A manually-operable hydraulic pump clutch is interposed between the engine's shaft and the hydraulic pump for selectively engaging and disengaging the pump from the engine. A quick-disconnect coupler mechanism is disposed along the length of a hydraulic line which is used to connect the hydraulic pump to a working hydraulic accessory detachably secured to the vehicle's frame. The coupler is of a type which prevents the hydraulic working fluid from flowing out of the lines when the quick-disconnect coupler is uncoupled. The hydraulic accessory would typically include a hydraulic motor and a tool of some sort driven by that hydraulic motor. The hydraulic motor may be a part of the accessory itself or, alternatively, may be a part of the vehicle so as to be used with a variety of working attachments.

9 Claims, 11 Drawing Figures

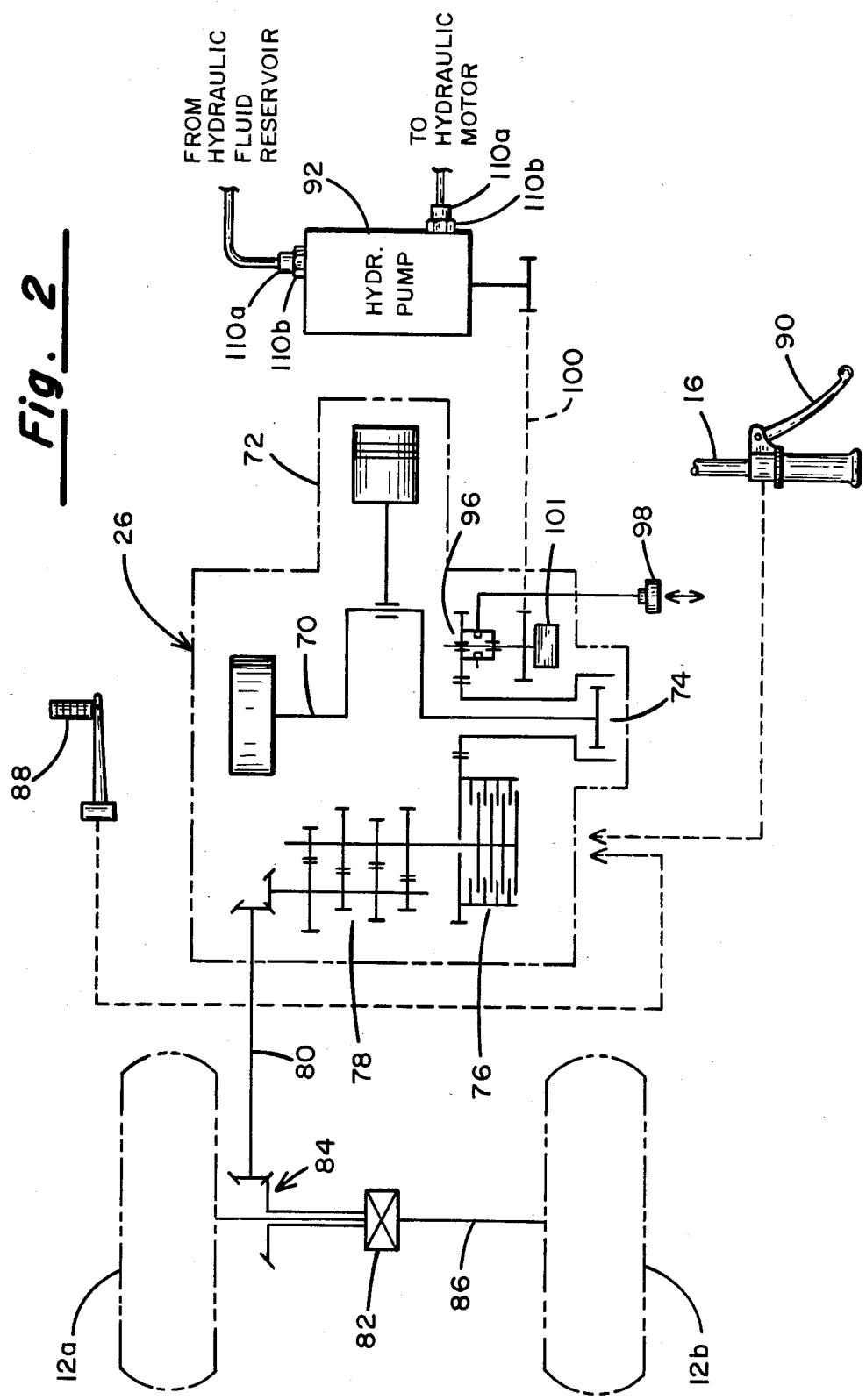

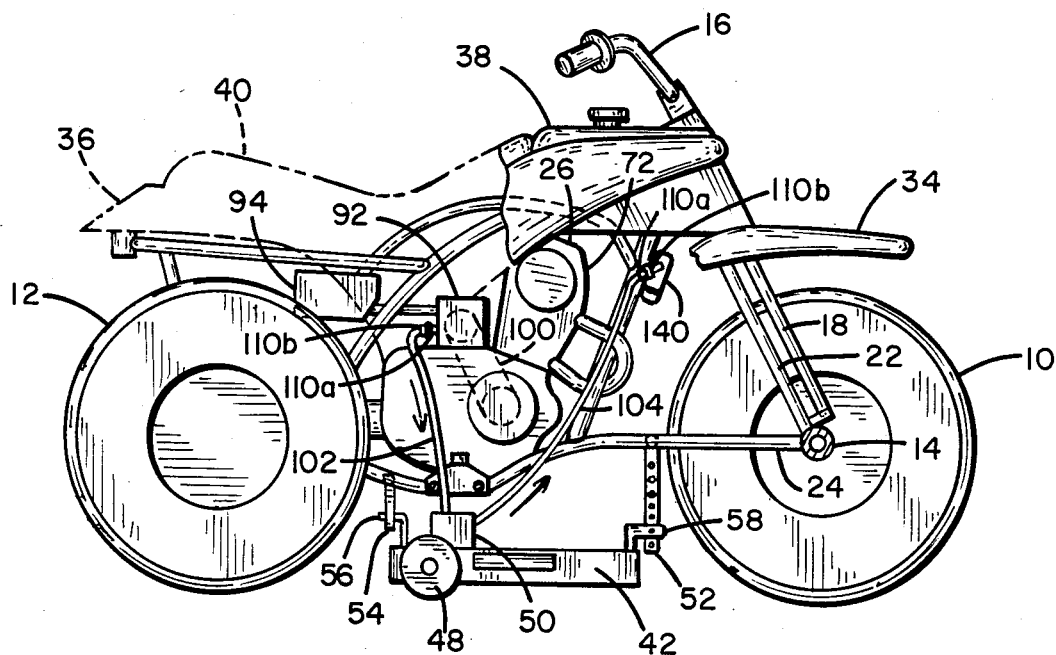
Fig. 10
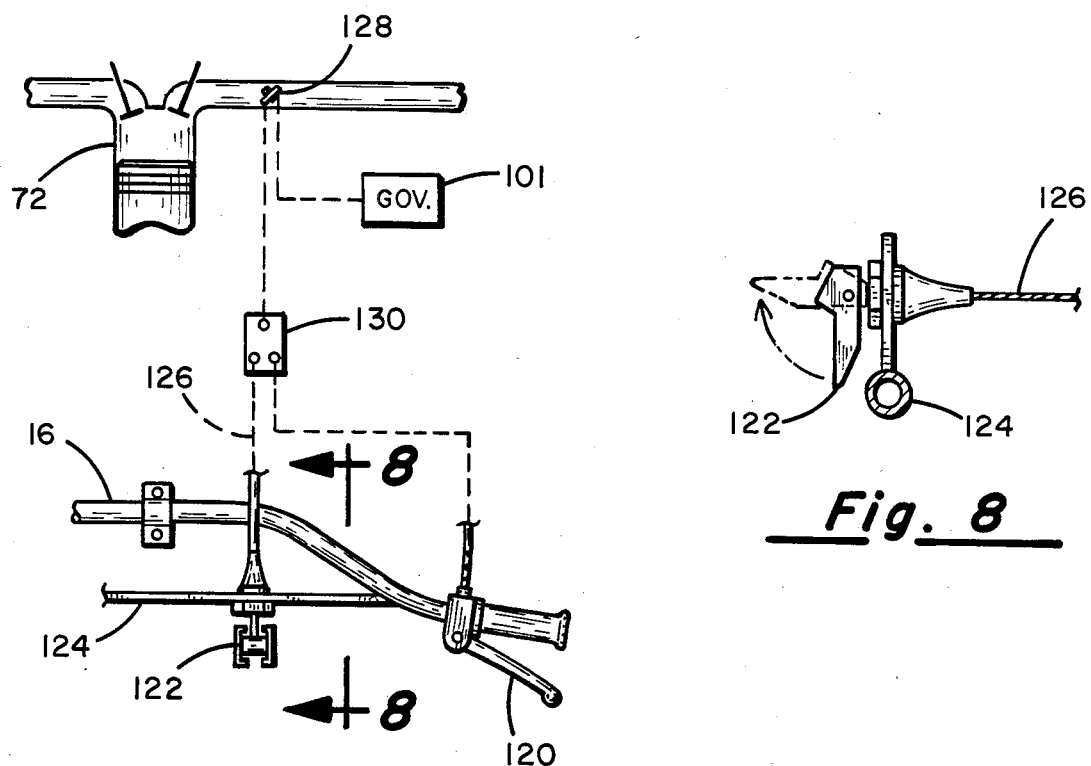
Fig. 7
Fig. 8

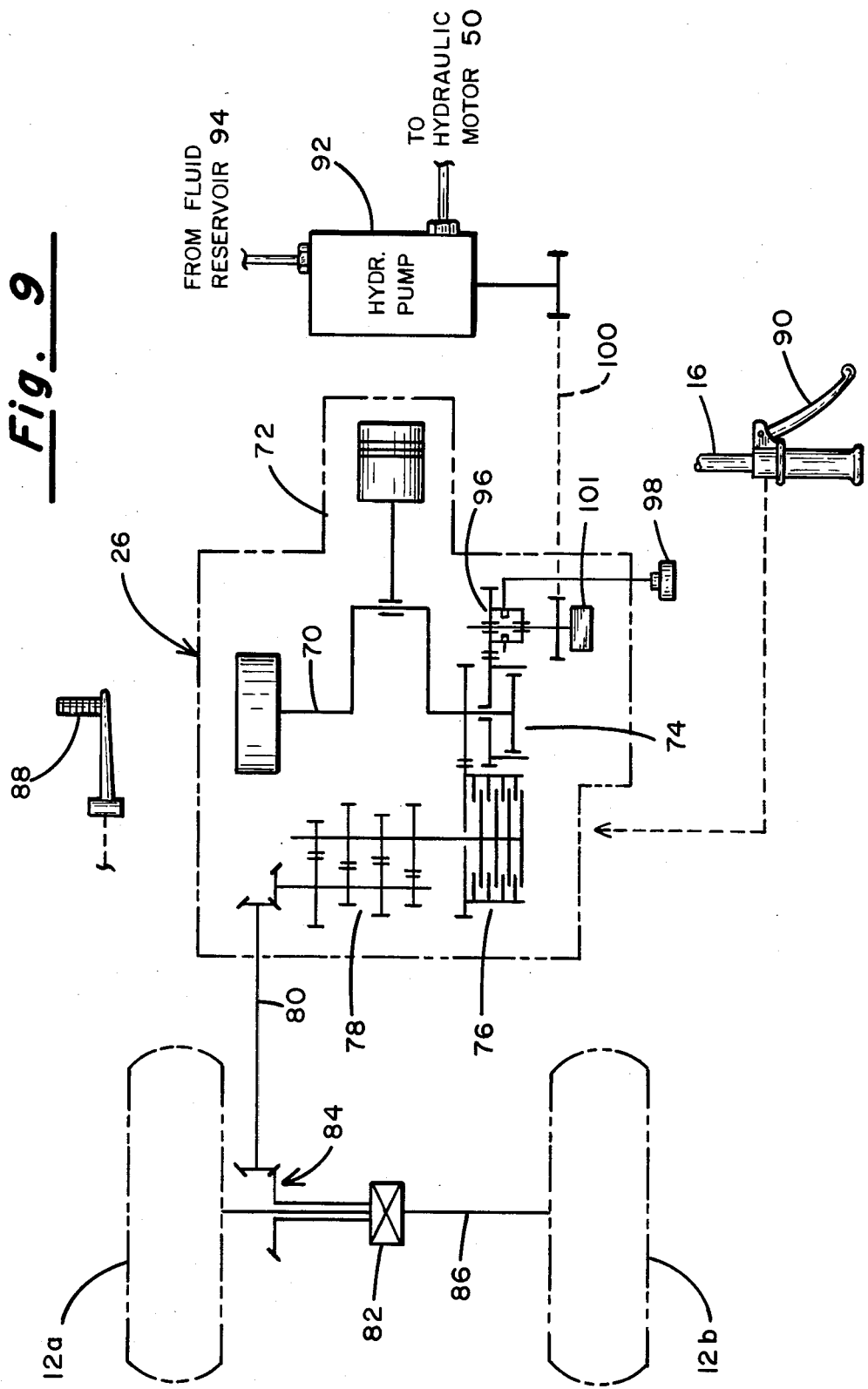

4,577,712

OFF-THE ROAD VEHICLE FOR RECREATIONAL AND WORK APPLICATIONS

BACKGROUND OF THE INVENTION

There exists in the prior art various off-the-road motor driven vehicles designed for sports and leisure-riding. Typically, such vehicles have three or more wide and ultra-low pressure tires and can travel at low speeds of 1–2 miles per hour and up to 35–40 miles per hour. In recent years, there has been a desire to use such vehicles not only for sporting and leisure purposes but also for work-related purposes, such as lawn mowing, snow removal, or agricultural chemical dusting. Various accessories, such as snow blowers and plows, lawn mowers, log splitters, etc., have been designed for attachment to such off-the-road vehicles and are presently available. One drawback to the accessories currently available is that two engines, one for driving the vehicle and the other for driving the accessory, are generally required, thus making the system economically unfeasible.

The present invention relates to an off-the-road motor vehicle which can be used for a plurality of sport and utilitarian purposes. More particularly, the invention relates to an off-the-road vehicle which may be equipped with a hydraulic pump mechanism for driving a hydraulic motor which, in turn, may be used to power a lawn mower, a snow blower, a log splitter or a duster for agricultural chemicals, all of which are readily attachable and detachable. This allows the vehicle to be used not only for sporting purposes but also as a work vehicle. With the present invention, converting the vehicle from a sports vehicle to a work vehicle, or from a work vehicle to a sports vehicle, can be accomplished in a matter of minutes.

SUMMARY OF THE INVENTION

The present invention has been conceived in view of the background thus far described and has a first object to provide an off-the-road vehicle which can be used for recreational purposes or for multiple utilitarian purposes by attaching various accessories which are driven by a hydraulic drive mechanism powered by the vehicle's running engine.

A second object of the present invention is to provide an off-the-road vehicle which can facilitate attachment and detachment of the working accessories in accordance with an intended purpose of use.

The third object of the present invention is to provide an off-the-road vehicle which can be easily and economically used both as a sports vehicle and as a work vehicle.

The fourth object of the present invention is to provide an off-the-road vehicle which can be quickly converted from a sports vehicle to a work vehicle or from a work vehicle to a sports vehicle.

These and other object and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE DRAWINGS

FIG. 2 is a schematic mechanical diagram showing the power train system of the present invention;

FIG. 7 is a diagram of the throttling mechanism;

FIG. 8 is a sectional view taken along line VIII—VIII of the throttle mechanism of FIG. 7;

FIG. 9 is a diagram showing the power train system forming an alternative embodiment; and FIG. 10 is a side elevation showing still another alternative embodiment.

DESCRIPTION OF THE PREFERRED EMBODIMENT

Figure 1:
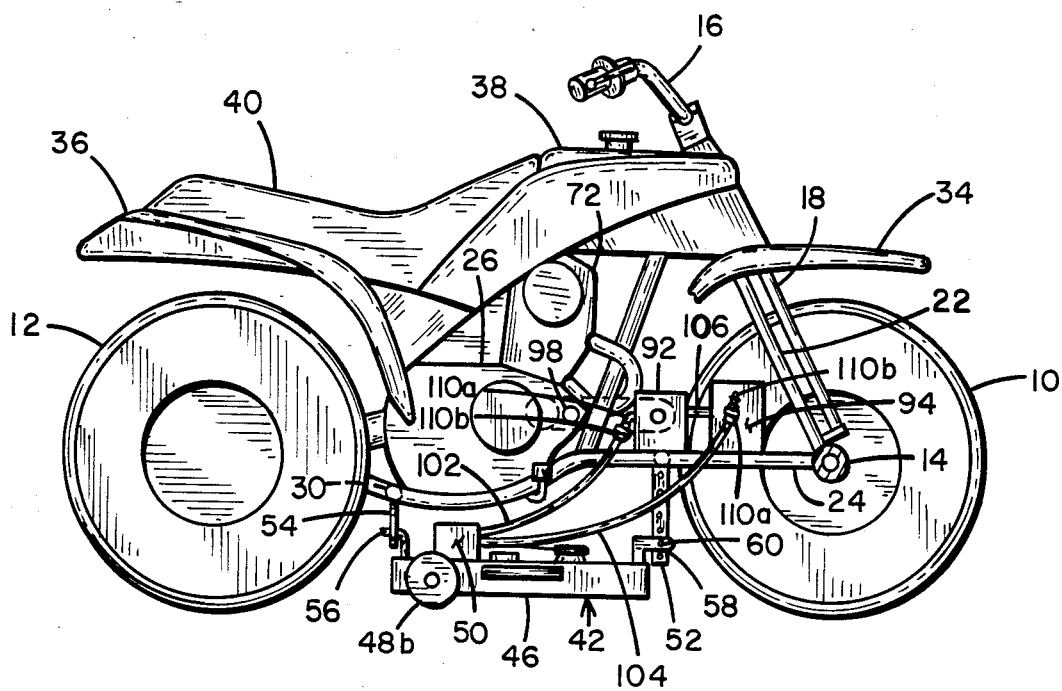
FIG. 1 is a side elevation showing one embodiment of the present invention.
Figure 3:
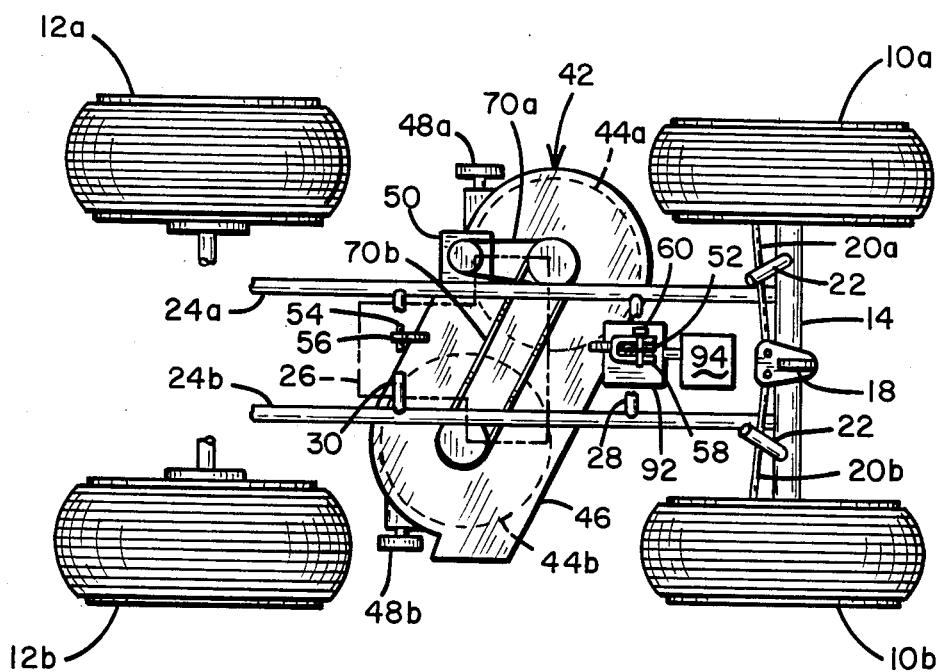
FIG. 3 is a top plan view showing the manner in which an accessory, such as a lawn mower, is attached.

As is best shown in FIGS. 1 and 2, a preferred embodiment of the invention includes an off-the-road vehicle, an attachment such as a lawn mower, and means to hydraulically drive the attachment using power generated by the vehicle's drive engine.

The vehicle of the preferred embodiment has two front wheels 10a and 10b and two rear wheels 12a and 12b. The wheels are provided with wide and ultra-low pressure tires. The front wheels 10a and 10b are rotatably journaled on the two ends of a front axle 14, and the rear wheels 12a and 12b are rotatably journaled on both ends of a rear axle 86 (FIG. 2).

Attached to the front axle 14 is a steering shaft 18 which is integral with a steering handlebar 16. Rotations of the steering handlebar 16 are transmitted to the front wheels 10a and 10b through the tie rods 20a and 20b.

The front axle 14 is connected to and made integral with the vehicle frame by upright tubular braces 22 and horizontal tubular braces 24a and 24b. Upright tubular braces 22a and 22b extend upward from axle 14 and merge together at a point below and in back of handlebar 16. A main frame tube (not shown) extends obliquely backward and downward from the merged portions of upright braces 22a and 22b to the rear end of horizontal tubes 24a and 24b at a location at or near rear axle 86. The horizontal tubes 24a and 24b are further joined by tubular cross-braces 28 and 30.

An engine unit, indicated generally by numeral 26, is mounted on the lower rear portion of the frame above and supported by horizontal braces 24a and 24b. Mounted in front of engine unit 26 is a hydraulic pump 92 which has an hydraulic reservoir 94 and a slide mesh-type hydraulic pump clutch 96.

Other parts of the vehicle specifically shown in the drawings include a front fender 34, which has its right and left portions molded integrally to cover the top of the right and left front wheels 10a and 10b. A rear fender 36, which also has right and left portions molded integrally to cover the top of the right and left rear wheels 12a and 12b, is also present. Located above the main frame tube and behind the handlebar 16 are a fuel tank 38 and a rider's seat 40. Rider's seat 40 is mounted to extend from the back of fuel tank 38 to above the rear fender 36.

Best shown in FIGS. 1, 3, 4 and 5 are the means by which an attachment, such as a lawn mower, can be secured to the vehicle. As shown in FIG. 1, a lawn mower mechanism 42 is suspended below the horizontal braces 24a and 24b of the frame. The mower head 42 has a pair of rotary blades 44a and 44b, and a casing 46 covers the tops and sides of the blades 44a and 44b. A pair of small wheels 48a and 48b are attached to the right and left sides of the casing 46. A hydraulic drive motor 50 is detachably mounted on the upper surface of casing 46 so as to protrude upward. The rotary blades 44a and 44b are driven by the hydraulic drive mechanism 50 by belts 70a and 70b.

Figure 4:
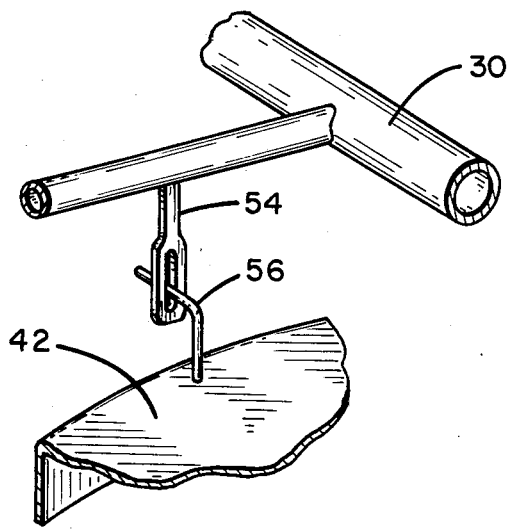
FIGS. 4 and 5 are partial perspective views showing the mechanism by which an accessory, such as a lawn mower, is attached to the vehicle.
Figure 5:
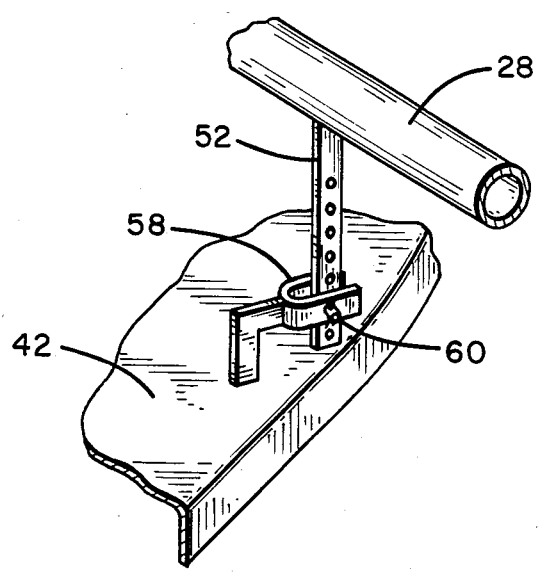

The mower 42, itself, is physically secured to the frame by a front coupling, best shown in FIG. 5, and a rear coupling best shown in FIG. 4. As shown in FIG. 5, attached to cross-member 28 of the vehicle frame is a downwardly extending steel strap 52 which has a plurality of vertically arrayed perforations. Extending upward from the blade housing 46 of mower 42 is an arm having a right angle bend and a U-shaped yoke or bracket 58. Diametrically opposed to each other on the arms of the U-shaped bracket are two bore holes through which connecting pin 60 can be placed. When in use, the two diametrically opposed bore holes of the yoke 58 are aligned with an appropriate perforation of the strap 52 and connecting pin 60 is placed through all three holes to secure the yoke 58 to strap 52.

As shown in FIG. 4, the rear coupling is comprised of a fixed sloted plate 54 which has been welded or otherwise secured to and extends downwardly from frame cross-member 30. The slot in plate 54 is vertically elongated and is designed to receive the horizontal portion of right angle rod 56 which extends upwardly from the blade housing 46 of mower 42. Sufficient play has been designed into this coupling to allow for transverse rocking and vertical movement due to irregularities in the lawn surface. Sufficient clearance is maintained between the blades 44a and 44b and the lawn by wheels 48a and 48b.

Shown in FIG. 1 are two other connections between the lawn mower accessory and the vehicle. These connections, of course, can be used with other accessories, such as an agricultural sprayer, snow blower or log splitter. Hydraulic lines 102 and 104 are present to form a hydraulic circuit between the hydraulic pump 92 located on the vehicle frame and the hydraulic motor 50 plugged into the accessory.

As shown schematically in FIG. 2, the engine unit 26 is composed of an engine 72 having a transverse crankshaft 70; a centrifugal clutch 74 connected to the crankshaft 70; a shift clutch 76 adapted to be revolved through the centrifugal clutch 74; and a well-known transmission 78 of a constant mesh-type adapted to be revolved through the shift clutch 76. The revolutions of the transmission 78 are transmitted to a rear axle 86 and the rear wheels 12a and 12b through a power train 84 composed of a drive shaft 80 and a differential 82.

A shift pedal 88 is associated with the shift clutch 76 to release the same. If shift pedal 88 is depressed, the shift clutch 76 is first released and the speed change of the transmission 78 is then effected. A hand clutch lever 90, which is hinged to the steering handle 16, is also present. Hand clutch lever 90 can also be used to apply or release the shift clutch 76. The transmission 78 can be selected to a neutral position in which it blocks the transmission of rotational power to the wheels.

The means by which an accessory, such as the lawn mower, power rake or snow blower, are driven include the hydraulic pump 92 which is mounted in front of engine 26. Pump 92 has a hydraulic reservoir 94 and a hydraulic pump clutch 96 of the slide mesh-type. Clutch 96 is manually actuated into and out of engagement with the aforementioned centrifugal clutch 74 by means of a hand knob 98. The revolutions of the output shaft of that clutch 96 are transmitted through chain 100 to the pump 92.

When knob 98 is brought into the position shown in FIG. 2 to connect the hydraulic pump 92, and the engine's speed in revolutions per minute is increased, the hydraulic pump 92 is then driven by engine 72 through centrifugal clutch 74. The hydraulic fluid discharged by pump 92 is pumped through hydraulic line 102 to the hydraulic motor 50 located on the lawn mower accessory so that this motor 50 rotationally drives the rotary blades 44 of mower 42 via belts 70a and 70b. The hydraulic fluid to be returned from the hydraulic motor 50 flows to the reservoir 94 via hydraulic line 104 and again to hydraulic pump 92 via the line 106. The driven portion of the accessory may have an operating speed unique to it. For example, the blade speed of a lawn mower may be different from the auger speed of a snowblower attachment. Using the present invention, the necessary gearing for each separate attachment may be designed into the attachment so as to work with the same hydraulic motor 50, which motor is then suitably removably coupled to the accessory and is common to all accessories.

Because with the system being described the revolutions per minute of the engine can greatly fluctuate with changes in load upon the engine due, for example, in the case of a lawn mower, to changes in the undulations of the ground and the length of the grass being cut, a governor 101 is provided to even out these fluctuations. Governor 101 is connected to the output shaft of the hydraulic pump clutch 96 and operates to open or close a throttle valve 128 (see FIG. 7) of the carburetor in accordance with the change in the r.p.m. of crankshaft 70.

It should be noted here that hydraulic lines 102 and 104 can be connected or disconnected at a midway point by means of a coupler 110. The construction of coupler 110 is shown in detail in FIG. 6. A separate coupler 110 is provided along each of the hydraulic lines 102 and 104.

Figure 6A:
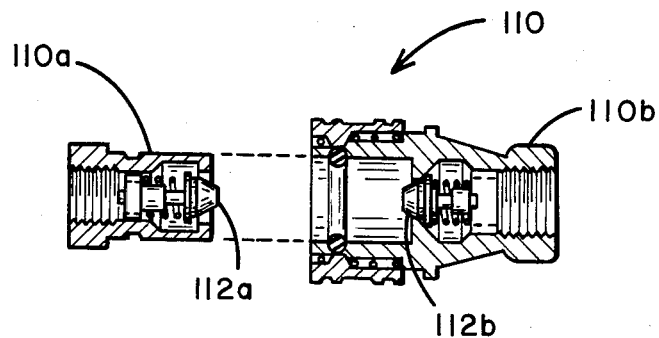
FIGS. 6A and FIGS. 6B are sectional views showing the means by which the drive mechanism of the accessory is attached to the vehicle.
Figure 6B:
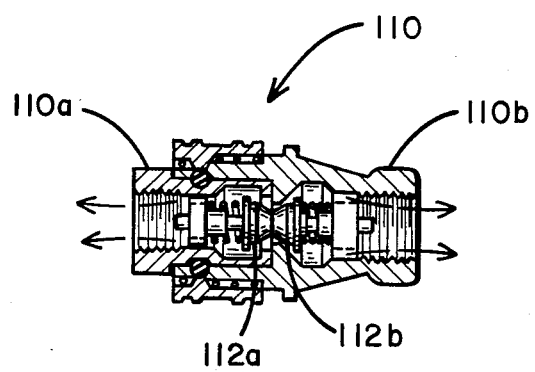

As shown in FIG. 6, coupler 110 is composed of a plug 110a and a socket 110b. Plug 110a and 110b are provided with valve members 112a and 112b, respectively. In the position wherein the plug 110a and the socket 110b are separated, as shown in FIG. 6A, the individual valve members 112a and 112b are automatically urged into their respective valve seats to close off the hydraulic lines. Where the plug 110a and the socket 110b are joined, as in FIG. 6B, the two valve members 112a and 112b abut against each other to become unseated and open the lines for flow of hydraulic fluid therethrough. As a result, when hydraulic lines 102 and 104 are disconnected, via coupler 110 (such as in the case where mower 42 is detached), the lines are automatically closed so no fluid will leak out. By properly polarizing the connector elements, erroneous hook-ups can be avoided to ensure that the hydraulic motor will not be driven in a reverse direction.

Turning now to FIGS. 7 and 8 which show the throttling mechanism, indicated at reference numeral 120 is a running throttle lever which is used in the event that mower 42 is detached and the vehicle is being used as a recreational vehicle. An accessory throttle lever 122 is also present. Accessory throttle lever 122 is hinged at cross-bar 124 of handlebar 16. The accessory throttle lever 122 pulls a wire 126 by a predetermined length, when it is turned from a home position shown in the solid lines in FIG. 8 to a raised position shown in the phantom lines, to maintain the throttle valve 128 (see FIG. 7) in a predetermined open position. This throttle lever 122 makes it possible to achieve both the optimum vehicle speed and blade speed for mowing.

Referring still to FIG. 7, numeral 130 identifies a junction box which is used to coordinate the operation of the running throttle lever 120 and the accessory throttle lever 122 relative to the throttle valve 128. When the lever 122 is pulled to the position represented by the solid lines in FIG. 8, both throttle levers are in a controlling relationship. However, when lever 122 is moved to the phantom line position in FIG. 8, lever 120 does not control the throttle valve.

Now the operation of the present invention will be explained. For leisure or sport riding, mower 42 is detached from the vehicle frame and the two couplers 110 of hydraulic lines 102 and 104 are disconnected. Knob 98 is then pulled out sideways of the vehicle body to release the hydraulic pump clutch 96 and the accessory throttle lever 122 is set in the solid line position shown in FIG. 8. This entire process takes less than one minute. When the engine is started, the vehicle can be used for leisure riding by operating the running throttle lever 120 and the shift pedal 88. The speed of the engine 72 is increased by throttle lever 120, and more specifically, the centrifugal clutch 74 can be applied to transmit the revolutions of the engine to the rear wheels 12a and 12b through the transmission 78 and the power train 84. When shift pedal 88 is operated, the shift clutch 76 is first released in response to the shifting operation, and the speed change of the transmission 78 is then conducted. Since the clutch 96 for the hydraulic pump has been released, the pump 92 is left inoperative, and the chain 100 is left immovable. As a result, no rotating shaft member is exposed to the outside from the sides of the vehicle body so that improved safety is insured. Further, and as described above, when couplers 110 are separated, they are automatically closed by the action of their internal valve members 112a and 112b so that no hydraulic fluid will leak out.

When the vehicle is desired to be used as a work vehicle, the desired accessory, such as mower 42, is first attached to the vehicle frame via the rear and front coupling mechanism shown in FIGS. 4 and 5 respectively. The two couplers 110 of hydraulic lines 102 and 104 are then connected. Next, knob 98 is pushed to apply the pump clutch 96, and the accessory throttle lever 122 is raised to the phantom line position shown in FIG. 8. Again, this process takes less than one minute. In this condition, the revolutions of the engine 72 are transmitted not only to the rear wheels 12 but also to the hydraulic pump 92 through centrifugal clutch 74, the pump clutch 96 and the chain 100. The hydraulic fluid pumped from pump 92 is fed via the line 102 to the hydraulic motor 50, thereby actuating the mower 42. The hydraulic fluid is returned from the hydraulic motor 50 via the hydraulic lines 104 to the reservoir 94 and then to the inlet to pump 92. The design allows both the vehicle and the attachment to be run at their optimum speeds for performing the desired work function.

Just a few of the advantages of the above-described system are as follows:

1. Since an accessory, such as the mower 42, can be removably attached, the off-the-road running vehicle can be used for leisure as well as for work-related projects, such as lawn mowing.
2. Since the accessory (e.g., the mower 42) is hydraulically actuated, attaching and detaching the accessory can be conducted remarkably easily and quickly by connecting and disconnecting the couplers 110 in lines 102 and 104. Couplers 110 are designed so that they will automatically close and prevent any hydraulic fluid from leaking when disconnected.
3. The accessory can be operated while the vehicle is halted by placing and maintaining transmission 78 in its neutral position. This feature permits the use of accessories, such as log splitters.
4. Safety is enhanced because when the accessory is detached and the hydraulic pump clutch 96 is released, the rotary transmission members such as the sprocket or chain at the sides of the vehicle frame are kept immovable.
5. Hydraulic pump clutch 96 allows the pump 92 to be interrupted when the accessory is detached and the vehicle is being used for leisure or sports riding.
6. Even if the working parts of an accessory (such as the rotary blades 44 of mower 42 or the auger of a snow blower) are slowed down or stopped as a result of hitting some object or becoming jammed with debris, the engine 72 is not killed thanks to the slippage of the centrifugal clutch 74 which is interposed between the crankshaft 70 and the pump clutch 96.
7. Thanks to the provision of the centrifugal clutch 74, the hydraulic pump clutch 96 can switch the connection and disconnection without killing the engine when the engine revolves at a low r.p.m. such as during idling. The accessory can also be disconnected so that it can be easily cleaned.
8. Since the shift clutch 76 can be released or applied not only by shift pedal 88 but also by hand clutch lever 90, if desired, the vehicle can be promptly stopped while the accessory continues to run.
9. Both the optimum vehicle speed and accessory speed can be independently obtained to perform the desired work project because the vehicle speed is controlled by throttle lever 120 and the accessory speed is controlled by throttle lever 122. Stated otherwise, since the accessory throttle lever 122 and junction box 130 are included, the vehicle can be made to run at a desired ground speed suitable for the work to be performed with the accessory being driven at a generally constant speed also related to the work function the accessory is to do.
10. Due to the provision of the governor 101, the engine 72 can always be run at a constant revolution per minute even if the load upon the accessory fluctuates.
11. Since an accessory, such as lawn mower 42, can be mounted between the front and rear wheels, it is unnecessary to increase the length of the vehicle which would interfere with the handling of the vehicle.
12. The same hydraulic pump/motor combination can be used to power a variety of work performing accessories, each with its own speed/torque requirements by properly designing the gear ratios of the transmission built into the accessory and detachably coupled to the hydraulic motor.

FIRST ALTERNATIVE EMBODIMENT

FIG. 9 is intended to show an alternative power transmission system. In this embodiment, the revolutions of the crankshaft 70 are transmitted directly to the shift clutch 76 and indirectly through centrifugal clutch 74a to the hydraulic pump clutch 96. Moreover, the shift clutch 76 is applied only by the hand clutch lever 90. Since the other construction is similar to that of the embodiment shown in FIGS. 1 through 8, the same portions are indicated with the same numerals, and their explanations are not repeated.

SECOND ALTERNATIVE EMBODIMENT

In the alternative embodiment shown in FIG. 10, the hydraulic pump 92 is mounted on the crankcase, and the hydraulic reservoir 94 is mounted on the rear of the pump 92 between the rear wheels 12a and 12b. Midway of the hydraulic line 104 for circulating the fluid from the hydraulic motor 50 to the reservoir 94, there is disposed a cooler 140 for the hydraulic fluid. This cooler forms a part of the hydraulic pressure generating mechanism and is arranged in front of the engine 72 where it is less affected by heat radiating from the engine. The same structural elements and parts common to as those of FIGS. 1-8 are indicated with the same reference numerals in FIG. 10, and no further explanation of these elements and parts are felt to be necessary.

In each of the foregoing respective embodiments, the driving force for the pump 92 is extracted from the crankshaft 70 of the engine 72. According to the present invention, however, good results are obtained when the pump 92 is driven directly from the crank via the clutch 74(A) (FIG. 9) rather than downstream of the main transmission. However, if desired, a construction wherein an intermediate shaft is interposed between the crankshaft 70 and the transmission 78, the driving force for the pump 92 may be extracted from that intermediate shaft. Moreover, the accessory to be driven by the hydraulic pump and motor should not be limited to a lawn mower 42 but, as previously suggested, may be a duster for agricultural chemicals, a snowblower or some other labor-saving device.

Since the centrifugal clutch 74 or 74a is interposed between the engine 72 and the hydraulic pump clutch 96, the foregoing respective embodiments allow the clutch 96 to be smoothly shifted when the engine 72 is at idling speed without killing the engine.

As has been described hereinabove, according to the present invention, the driving force for the hydraulic pump is extracted from the upstream of the transmission of the engine unit mounted on the vehicle via the pump clutch 96. The vehicle of the present invention can be used for the multiple purposes, such as for work or for sport or leisure riding, by applying or releasing the hydraulic pump clutch and by attaching or detaching the working hydraulic accessory. Because separate clutches/transmissions are used for driving the vehicle's wheels and for driving the hydraulic pump/motor combination, the engine can be run at an optimum speed for both recreational off-the-road activities and for slower paced activities such as grass mowing. Moreover, this working accessory can easily be attached to detached because it is hydraulically driven and because the couplers disposed in the hydraulic lines are easily connected or disconnected for the attachment or detachment.

Obviously, numerous modifications and variations of the present invention are possible in light of the above teachings, it is therefore to be understood that within the scope of the claims appended hereto, the invention may be practiced otherwise than is specifically disclosed herein.

What is claimed is:

1. In combination with an off-the-road motor power recreational vehicle of the type comprising at least one steering front wheel, two relatively large size, low pressure driving rear wheels, an engine unit mounted in the vicinity of the center of a vehicular body for transmitting the revolutions of the output shaft of said engine unit to said rear wheels through a transmission, and a rider's seat arranged above and at the back of said engine unit, a means for rapidly converting said recreational vehicle to a working vehicle and vice versa comprising:
    (a) a hydraulic pump means adapted to be driven by said output shaft at a point upstream of said transmission;
    (b) a hydraulic fluid reservoir;
    (c) a manually operable hydraulic pump clutch interposed between said engine output shaft and said pump means;
    (d) a hydraulic motor coupled in driving relation to a working accessory;
    (e) quick-disconnect coupler means disposed in a hydraulic line connecting said hydraulic pump to said hydraulic motor, said quickdisconnect coupler means having valve members for preventing hydraulic fluid from flowing out of said lines when said coupler is in its separated state; and
    (f) means for rapidly coupling and uncoupling said working accessory to and from said vehicular body.

2. An off-the-road recreational vehicle as set forth in claim 1 wherein said engine unit includes a pedal-operated shift clutch means for effecting connection and disconnection of said transmission and a centrifugal clutch means interposed between said pedal-operated shift clutch means and said engine.

3. An off-the-road vehicle recreational as set forth in claim 2 wherein the revolutions of said engine's output shaft are transmitted to said hydraulic pump through said centrifugal clutch means and said hydraulic pump clutch means.

4. An off-the-road vehicle as set forth in claim 3 wherein the revolutions of said engine's output shaft are transmitted to both said pedal operated shift clutch means and said manually operable hydraulic pump clutch through said centrifugal clutch means.

5. An off-the-road vehicle as set forth in claim 3 wherein the revolutions of said engine's output shaft are transmitted to said shift clutch means and said manually-operated hydraulic pump clutch through differing centrifugal clutch means, respectively.

6. An off-the-road vehicle as set forth in claim 2 wherein said pedal-operated shift clutch means is also applied or released by a hand-operated clutch lever.

7. An off-the-road recreational vehicle as set forth in claim 6 further comprising a centrifugal clutch interposed between said engine and said hydraulic pump clutch so that the revolutions of said engine's output shaft are transmitted to said transmission through said pedal-operated shift clutch and to said hydraulic pump through said centrifugal clutch means and said hydraulic pump clutch.

8. An off-the-road vehicle as set forth in claim 1 wherein said quick-disconnect coupler includes a first separable mating plug and socket combination for joining the low pressure side of said hydraulic pressure generating mechanism to a flexible fluid conducting tube leading to said hydraulic fluid reservoir and a second separable mating plug and socket combination for joining the high pressure side of said hydraulic pressure generating mechanism to a flexible fluid conducting tube leading to said hydraulic plug and socket combinations being polarized to preclude the plug of said first combination from being mated with the socket of said second combination.

9. The off-the-road recreational vehicle as in claim 1 wherein said last-named means comprises: a hook member secured to one of said frame and working accessory; an eye member secured to the other of said frame and working accessory for receiving said hook member; and a clevis coupling including a U-shaped bracket having aligned apertures in the legs of said U-shaped bracket, said U-shaped bracket being attached to one of said frame and working accessory, an apertured strap affixed to the other of said frame and working accessory, said strap extending between the legs of said U-shaped bracket and a clevis pin insertable through said aligned apertures in said U-shaped bracket and one of the apertures in said strap.

* * * * *